United States Patent [19]
Yu

[11] Patent Number: 5,991,471
[45] Date of Patent: Nov. 23, 1999

[54] CONFIGURABLE CHIRP MACH-ZEHNDER OPTICAL MODULATOR

[75] Inventor: Jun Yu, Stittsville, Canada

[73] Assignee: Nortel Networks Corporation, Montreal, Canada

[21] Appl. No.: 09/057,602

[22] Filed: Apr. 9, 1998

Related U.S. Application Data

[63] Continuation-in-part of application No. 08/745,168, Nov. 7, 1996, Pat. No. 5,778,113.

[51] Int. Cl.$^6$ .................................................. G02B 1/035
[52] U.S. Cl. .................................................. 385/3
[58] Field of Search ..................... 385/3, 4, 45, 9; 359/161, 248; 356/350; 372/94

[56] References Cited

U.S. PATENT DOCUMENTS

| | | | |
|---|---|---|---|
| 5,365,338 | 11/1994 | Bramson | 356/350 |
| 5,550,513 | 8/1996 | Wong | 330/286 |
| 5,694,504 | 12/1997 | Yu | 385/3 |
| 5,778,113 | 7/1998 | Yu | 385/3 |
| 5,859,936 | 1/1999 | Ishikawa | 385/4 |

FOREIGN PATENT DOCUMENTS 2 302 738  1/1997  United Kingdom .

OTHER PUBLICATIONS

Yu J et al: "Phase–engineered III–V MQW Mach–Zehnder modulators" IEEE Photonics Technology Letters, Aug. 1996, IEEE, USA. vol. 8. No. 8, pp. 1018–1020, XP000621639 ISSN 1041–1135 * pp. 1041 –1042, para. 2*.

*Primary Examiner*—Akm E. Ullah
*Attorney, Agent, or Firm*—Angela C. de Wilton

[57] ABSTRACT

A Mach-Zehnder optical modulator is provided having first and second modulation electrodes on respective first and second interferometric arms for receiving modulating electric fields, and the two modulation electrodes are of different lengths, the ratio of the lengths being designed to control the relative bias of the two arms, thereby provide for adjustment and optimization of frequency chirp, in a positive or negative chirp MZ modulator or in a configurable chirp MZ modulator. The modulator may have an asymmetric input y-junction coupler and an asymmetric output y-junction coupler to provide unequal power splitting, and interferometric arms defining two optical paths, which may be of equal or unequal length so as to generate a fixed phase difference of 0, $\pi$ or $\pi/2$. Preferably, the device is operated with equal push-pull drive, although non-equal push pull drive may alternatively be used. The asymmetric modulation electrodes may be used in combination with an additional control electrode or pair of control electrodes, and with equal or non-equal power splitting. This structure is applicable to either semiconductor MZ modulators or lithium niobate MZ modulators, and provides additional flexibility to optmize frequency chirp.

12 Claims, 3 Drawing Sheets

CONFIGURABLE CHIRP MACH-ZEHNDER OPTICAL MODULATOR

This is a Continuation-in-Part of application Ser. No. 08/745,168 filed on Nov. 7, 1996 now U.S. Pat. No. 5,778,113 by Jun Yu and entitled "Configurable Chirp Mach-Zehnder Optical Modulator".

FIELD OF THE INVENTION

This invention relates to a Mach-Zehnder (MZ) optical modulator, and particularly to a MZ optical modulator with built-in phase shift, and control means for generating a modulated optical signal with a high extinction ratio and configurable, positive or negative, frequency chirp.

BACKGROUND OF THE INVENTION

As described in copending US patent application No. 08/745,168 entitled "Configurable chirp Mach-Zehnder Modulator' to the present inventor (which is incorporated herein by reference) provision of higher transmission capacity in communication networks at competitive costs requires optimum utilisation of optical fiber transmission links. Optical transmission may be limited by effects such as chromatic dispersion, and spectral broadening, due in part to a wavelength shift, or chirp, caused by modulation of a laser source. A proper amount of chirp of an optical signal is important to achieve long haul and high bit rate transmission.

An alternative to directly modulated lasers is to use an electro-optical modulator which, in conjunction with a C.W. operated laser, offers the promise of a modulated signal with controllable chirp.

Prior art Mach-Zehnder modulators are commonly fabricated in lithium niobate ($LiNbO_3$) with titanium (Ti) diffused waveguides. More recently Mach-Zehnder modulators have been fabricated in III–V material such as InP with multi-quantum-wells of InP/InGaAsP in the guided regions. Such a device is described by Rolland et al ("10 Gb/s 120 km Normal Fiber Transmission Experiment Using a 1.56 $\mu$m Multi-Quantum-Well InP/InGaAsP Mach-Zehnder Modulator", Conf. Optical Fiber Communication, San Jose, Calif. 1993) in which some frequency chirp regulation is possible.

A Mach-Zehnder phase modulator is based on an interferometric configuration which converts phase modulation into intensity modulation. When the differential phase shift between the two arms of the modulator equals $\pm\pi$, the anti-symmetric mode is excited near the output and is subsequently diffracted out of the single mode waveguide. This is the 'off' or logic '0' state. With no differential phase shift, the fundamental mode is excited and propagates with little loss to the output. This is the 'on' or logic '1' state. The ability to control the frequency chirp of Mach-Zehnder modulators by varying the drive voltage to the arms or by a power splitting ratio has made them well suited for multi-gigabit long distance optical fiber transmission.

Mach-Zehnder III–V multi-quantum-well (MQW) modulators are increasingly attractive relative to other modulator designs because of their adjustable frequency chirp, low drive voltage, small size, long term reliability and potential for integration with laser sources. In III–V MQW Mach-Zehnder modulators where the two arms of the interferometer are of equal length with a power splitting ratio of 50%, the non-linear electro-optic effect imparts a small positive chirp under symmetric push-pull operation. While negative chirp can be induced by designing the y-junction to inject less optical power into the more deeply biased modulator arm and employing a small amount of overdrive, the back-to-back extinction ratio is degraded. This is described in greater detail in U.S. Pat. No. 5,524,076, issued Apr. 6, 1996, to Rolland et al.

The drive voltage which controls the differential phase shift is conventionally supplied to an electrode on one arm (single arm drive) or to both arms (dual arm drive) in a push-pull mode. Single arm drive requires a larger operating voltage than dual arm drive and generally provides more chirp than operation in a push-pull configuration. For a $LiNbO_3$ modulator, the dual arm configuration driven with equal push-pull voltage gives substantially zero chirp.

A $LiNbO_3$ Mach-Zehnder differs from a III–V MQW device because the latter shows a non-linear phase change as a function of bias voltage. In a $LiNbO_3$ Mach-Zehnder absorption increases with voltage applied to the arms while absorption is not present in a III–V semiconductor Mach-Zehnder modulator. The amount of absorption in the III–V device depends on how close the operating wavelength is to the exciton peak of the multi-quantum-well material.

Because the Mach-Zehnder modulator converts phase modulation into intensity modulation it is important that the ratio between the 'on' state and 'off' state is relatively high. This ratio, also known as the extinction ratio (ER), is a measure of the signal intensity against background noise. Consequently, a high extinction ratio also permits a greater span between repeaters in a transmission network.

Positive frequency chirp adversely affects long haul transmission over non-dispersion shifted fiber. In such situations, a controlled level of negative chirp provided by the optical modulator is advantageous. Some transmission networks make use of dispersion shifted or dispersion compensating optical fibers in which case negative chirp is not required, and in fact it may be more appropriate to provide the data pulses with a slight positive chirp. There is, therefore, a requirement for optical modulators capable of selectively providing a desired amount of positive or negative chirp.

In U.S. Pat. No. 5,694,504 issued Dec. 2, 1997 to the present inventor, entitled "Semiconductor modulator with $\pi$ shift" which is incorporated herein by reference, a multi-quantum-well Mach-Zehnder optical modulator having different optical lengths between respective paths is described. The optical paths have a length differential equal to a phase difference of $\pi$, or an integral odd multiple thereof, at the selected operating free space wavelength. This differential in optical path length means that the interferometer is in the "off" or logic "0" state in the absence of electric field and "on" or logic "1", with electric field applied. This results in negative chirp with a good extinction ratio.

Copending US patent application Ser. No. 08/745,168, to the present inventor, referenced above, describes a $\pi$ phase shifted Mach-Zehnder modulator with one additional control electrode to provide further adjustment of phase by application of an electric field, whereby a configurable chirp, either positive or negative, may be obtained in a modulator having a built in $\pi$ phase shift. This device is an InP/InGaAsP MQW Mach-Zehnder modulator with a structure substantially identical to that discussed in U.S. Pat. No. 5,694,504, except that the optical path through one modulator arm is elongated to produce the required relative $\pi$ phase shift at the $\lambda$=1.56 $\mu$m operating wavelength and an additional control electrode is provided. Operation of a Mach-Zehnder modulator having $\pi/2$ phase shift and an additional pair of control electrode to provide increased flexibility of continuously tuning chirp is also described. A device having $\pi/2$ phase shift and two control electrodes provides either good positive chirp and a good extinction ratio or alternatively good negative chirp and a good extinction ratio in the same device.

On the other hand, the range of chirp, and particularly the maximum amount of the negative chirp obtainable, may not be sufficient for some communications applications. Operation of these devices with pairs of modulation electrodes is typically based on symmetric push-pull drive to avoid complicated control electronics. Operation of these devices with unequal push-pull voltages on the modulation electrodes requires an asymmetric drive to provide different voltages to each modulation electrode, which further complicates the control electronics. Consequently, it is desirable to provide further improvements to optmize or simplify control of chirp in Mach-Zehnder modulators.

SUMMARY OF THE INVENTION

Thus, the present invention seeks to provide a Mach-Zehnder (MZ) optical modulator which can selectively generate controllable frequency chirp, and which avoids or reduces the above mentioned problems.

Therefore, according to a first aspect of the present invention there is provided a Mach-Zehnder phase modulator for selectively generating controlled chirp in an optical signal of a known free-space wavelength comprising:

an input y-junction waveguide coupler having an input waveguide for receiving the optical signal and first and second input branch waveguides an output y-junction waveguide coupler having an output waveguide for delivering the modulated optical signal and first and second output branch waveguides, a first interferometric arm between first branch waveguides of the input and output y-junction couplers defining a first optical path, a second interferometric arm between second branch waveguides of the input and output y-junction couplers defining a second optical path, and first and second modulation electrodes provided on the respective first and second interferometric arms for applying an electric field to each arm to modulate the efective phase difference between the arms, the first and second modulation electrodes differing in length, the length ratio of the first and second modulation electrodes being selected to optmize the amount of frequency chirp.

Since the longer the electrode, the greater the change in phase with change in control voltage, asymmetric modulation electrode dimensions provide another parameter to control and optimize chirp in a configurable chirp, positive chirp or negative chirp MZ modulator.

Preferably, the electric field may be applied to each arm in equal push-pull mode, although non-equal push pull mode may alternatively be used.

The first and second interferometric arms of the MZ modulator may be the same length to provide zero built in phase shift, or differ in length to generate a fixed phase difference, e.g. to provide $\pi$ or $\pi/2$ built-in phase shift. An asymmetric input y junction and asymmetric output y junction may be provided to provide non equal power splitting and thereby provide another means of controlling phase shift. Furthermore, the asymmetric modulation electrodes may be used in combination with an additional control electrode, or pair of control electrodes.

For example, for a $\pi$ shifted negative chirp MZ modulator, to obtain more negative chirp the modulation electrode length the electrode length of arm 0 is decreased, or of arm 1 is increased. Thus arm 1 is dc biased more deeply than arm 0 thereby arm 1 contributes to more red shift of light while are 0 contributes to less blue shift, relative to a modulator with equal length modulation electrodes.

Thus, the asymmetric modulation electrodes of different lengths provide for a simple way to provide for optimization of chirp in an MZ modulator.

The modulator may be fabricated as an III–V MQW semiconductor MS modulator. Alternatively, asymmetric modulation electrodes may be used with a $LiNbO_3$ modulator. The control electronics are simplified by the asymmetric modulation electrodes compared with using non-equal push-pull operation. In particular an extended range of negative chirp or positive chirp may be provided, to extend the range of chirp control for telecommunications applications.

Use of asymmetric modulation electrodes, with equal or non-equal push-pull drive, in combination with selectively adjusting the control field to respective arms with a single additional control electrode or pair of control electrodes, provides for continual frequency chirp adjustment from positive to negative, and thereby producing a fully configurable chirp MZ modulator with improved optimization of frequency chirp.

BRIEF DESCRIPTION OF THE DRAWINGS

The invention will now be described in greater detail with reference to the attached drawings wherein.

DETAILED DESCRIPTION OF THE INVENTION

Figure 1:
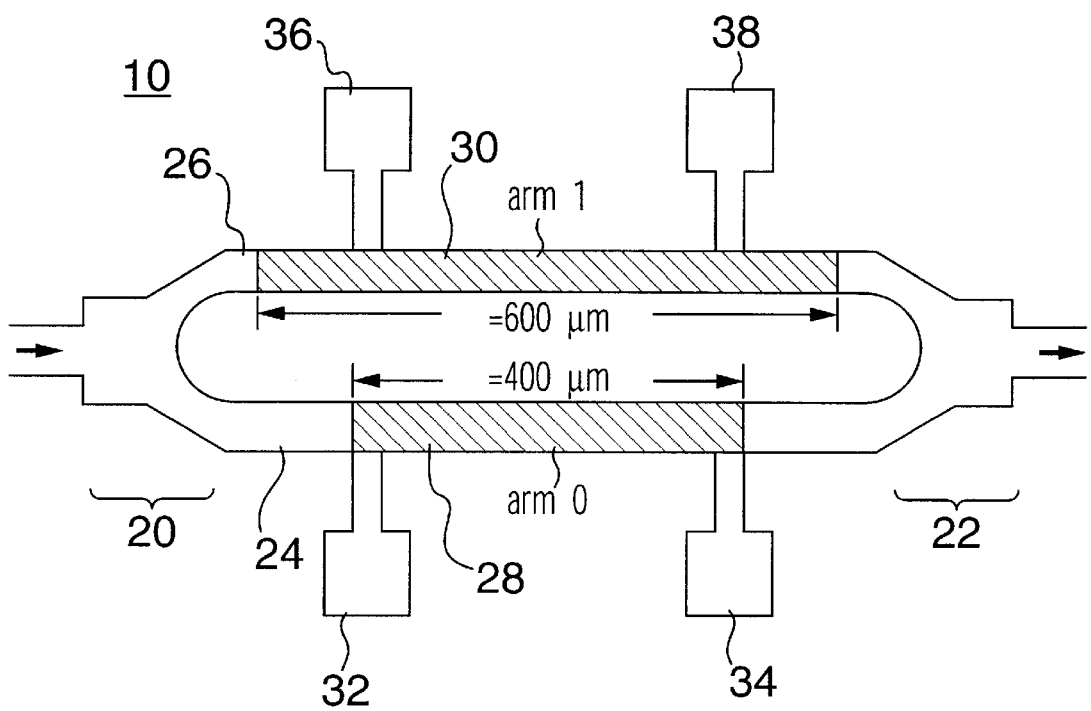
FIG. 1 shows a MZ modulator according to a first embodiment of the present invention.

A Mach-Zehnder (MZ) modulator 10 according a first embodiment of the present invention will now be described with reference to FIG. 1, which shows a simplified plan drawing of the structure. The MZ modulator 10 is formed in III–V material such as InP/InGaAsP having multi-quantum-wells. For a description of the material composition, reference may be made to U.S. Pat. No. 5,694,504 issued Dec. 2, 1997 to the present inventor. As shown in FIG. 1, the modulator structure 10 includes asymmetric input y-junction waveguide 20 and asymmetric output y-junction waveguide 22. Branch arms 24 and 26 are optically parallel and link the y-junction couplers as shown.

It is to be understood that the optical path length through arm 0 (24) of the interferometer may be the same as arm 1 (26) to provide zero built in phase shift, or longer than the path length through arm 1 (26) by the distance equivalent to $\pi/2$ or $\pi$ or an integral odd multiple thereof at the operating free space wavelength of the device. The optical path through one modulator arm is elongated to produce the required relative $\pi$ phase shift or $\pi/2$ phase shift at the operating wavelength. For an operating wavelength of $\lambda=1.56\ \mu m$, the additional waveguide length for a $\pi$ phase shift is given in terms of the modal refractive index neff by $$\frac{\lambda}{2n_{\it eff}} = \frac{1.56}{2 \times 3.23} \mu m = 0.241 \mu m$$

Each branch arm 24,26 has a modulation electrodes 28,30 respectively. The modulation electrodes 28 and 30 have bonding zones 32 and 34, and 36 and 38, respectively for connection to power sources and impedance termination as is well known in the art. A bias and modulation voltage in push-pull mode is supplied to pads 32,34, and 36,38 as described in detail in the above referenced patent application. The two modulation electrodes 28 and 30 for supplying a control voltage are asymmetric, being of different dimensions, in this case the two electrodes 28 and 30 have different lengths, for reasons to be described below.

Thus the structure of the modulator is similar to that described in the prior applications, except that the first and second modulation electrodes are of different dimensions, that is the modulation electrode on one arm is longer than the modulation electrode on the other arm of the modulator.

By introducing modulation electrodes of different lengths on each arm, the lengths being in a selected ratio to control the relative phase variation between the two arms, so that the amount of the frequency chirp may be optmized.

This asymmetric electrode structure can be applied to either equal push-pull or non equal push-pull devices. That is, this electrode configuration may be used with a positive chirp MZ or a configurable chirp MZ modulator, as described in the above referenced patents and the related applications. For example, an asymmetric modulation electrode structure may also be used with π/2 shifted negative chirp MZ, of the structure described in copending application Ser. No. 98/612 555, to optimize negative chirp.

For example, for a π shifted negative chirp MZ modulator, to obtain more negative chirp the length Lo of the modulation electrode length of arm 0 is decreased, or the length $L_1$ of the modulation electrode of arm 1 is increased. Thus arm 1 is dc biased more deeply than arm 0 thereby arm 1 contributes to more red shift of light while are 0 contributes to less blue shift, relative to a modulator with equal length modulation electrodes.

For equal push-pull, Δv and Δt are determined by the electrical driver. The longer the electrode the larger |Δφ| with the same |ΔV|, therefore the larger |Δv|. If the modulation electrodes are of equal length, the ratio of the phase variation is 2:1.

Figure 2:
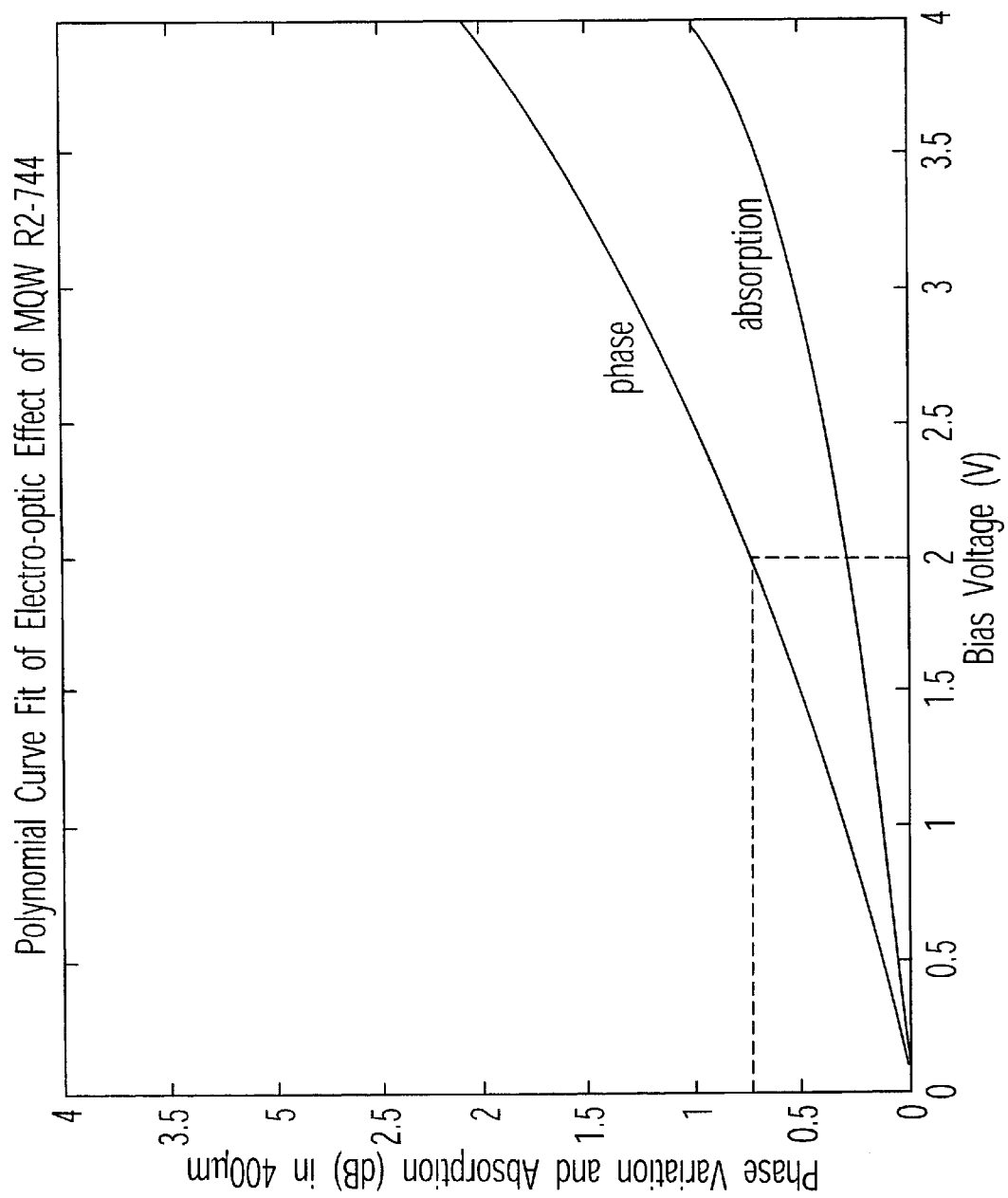
FIG. 2 shows the phase variation and absorption (dB) as a function of bias voltage for the MZ modulator of FIG. 1.
Figure 3:
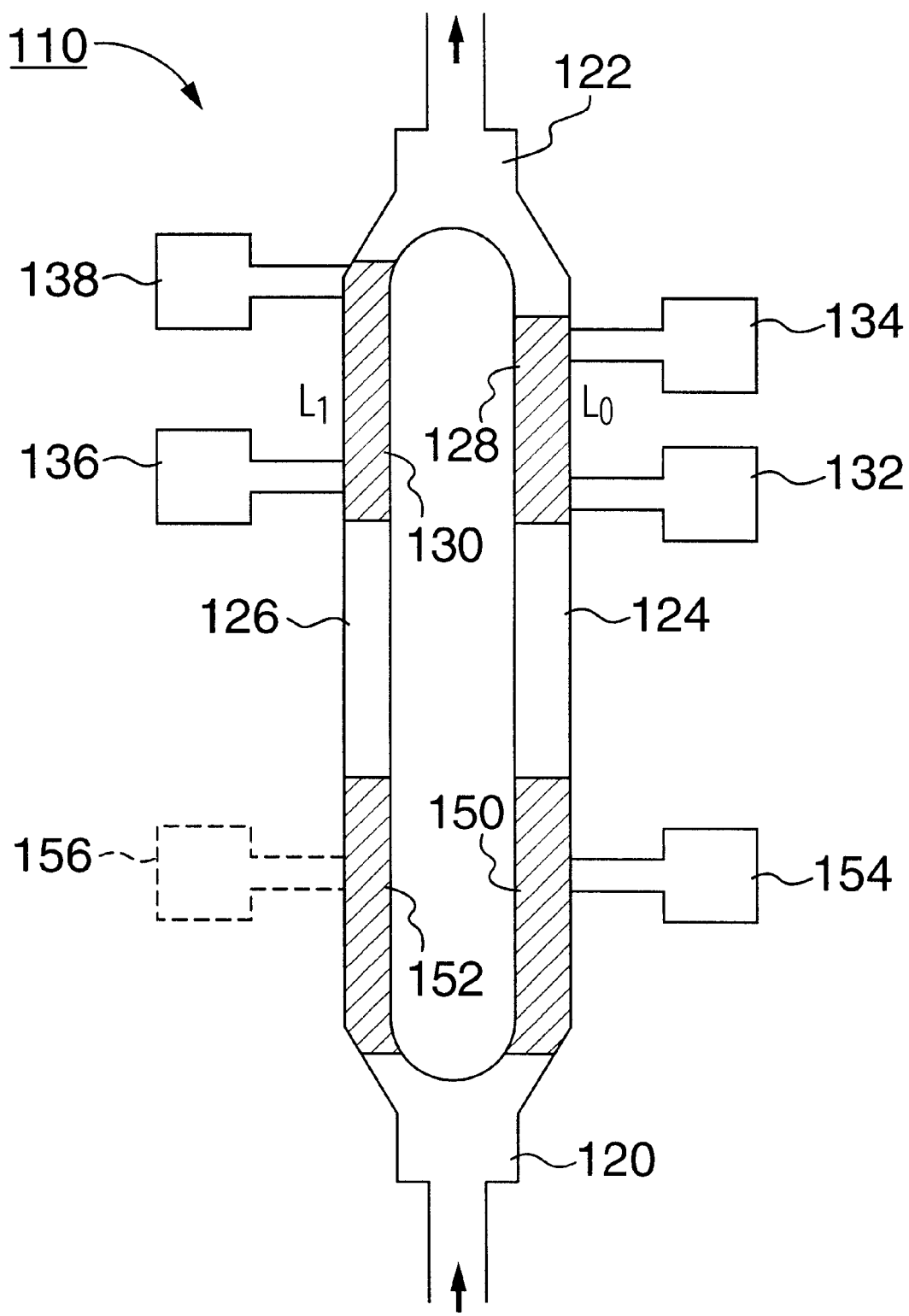
FIG. 3 shows a MZ modulator according to a second embodiment of the present invention.

FIG. 2 shows the phase change and electro-absorption as a function of reverse bias voltage on the modulation electrodes for the MZ modulator of FIG. 1. For example, for a voltage swing from 0 to 2 V, if the length of the electrode is 400 μm, |Δφ|≈0.75 as shown in FIG. 2. If the length of the electrode is 600 μm, |Δφ|≈1.1. Thus ratio of phase variation is 2.25/0.75 for asymmetric electrodes of length $L_0$=400 μm and $L_1$=600 μm In a semiconductor phase modulator the larger phase change in a push-pull configuration occurs in the more deeply DC-biased arm because of the non-linear nature of the quantum confined Stark effect. For a single-mode waveguide, the total optical field at the output of the modulator can be regarded to a first approximation as a weighted summation of the optical field from the two separate arms. The weight factors depend on the power splitting ratio of the two y-junctions and the photo-absorption in the modulation section. Thus, control of the power splitting may be used in conjunction with appropriate selection of the electrode length and modulation electrode field to optmize the amount of frequency chirp.

One drawback of the asymmetric modulation electrodes is that the speed of propagation of the signal through the two arms is non-equal. This effect may be overcome by increasing the size of the drive pads 32, 34 for the shorter modulation electrode 28 to increase their capacitance, relative to the size of the pads 36 and 38 for the longer electrode 30, as illustrated schematically in FIG. 1, thereby making the equivalent capacitance of both modulation electrodes equal.

Also, for the longer electrode, the drive voltage amplitude must be larger. Alternatively, this effect can be compensated by increasing the length of the longer electrode to slightly increase the phase shift for a given driven voltage amplitude. Thus, the required ratio of phase variation is obtained with a smaller drive voltage by increasing the length difference of the two electrodes.

In alternative embodiments, a modulator may be similar to that of the first embodiment except that the modulator may be fabricated with a π/2 phase shifted MZ at λ=1.56 μm. This requires that the additional length in one arm be 0.12 um. The first and second asymmetric modulation electrodes are as described for the first embodiment provide for an extended range of control of negative chirp, using equal push pull drive, or non-equal push pull drive, and equal or non equal power splitting, similar to the π shifted negative chirp MZ modulator described above In summary, the ratio of the lengths of the two asymmetric modulation electrodes on respective arms of a Mach-Zehnder modulator is a parameter that can be used to optimize the amount of frequency chirp for a push-pull driven MZ external modulator, for a positive chirp, negative chirp or configurable chirp design. This method of controlling or optimizing frequency chirp is applicable to both a semiconductor MZ modulator and a LiNbO3 MZ modulator.

The relative phase shift is determined by the length ration of the two modulation electrodes. At the limit, when the length shorter modulation electrode becomes zero, a one electrode single arm asymmetric drive is obtained.

In a MZ modulator 110 according to a second embodiment of the invention, the modulator 110 is similar in structure to the modulator 10 of the first embodiment, comprising asymmetric modulation electrodes 128 and, a built in π phase shift created by a length differential of the arm 0 (124) and arm 1 (126), and the input y junction 120 and output y junction 122 are asymmetric to control non-equal power splitting. The structure differs from that of the first embodiment in including an additional pair of control electrodes 150 and 152, to be used in combination with the asymmetric modulation electrodes. The control electrodes 150 and 152 are operable as described in the above reference US patent application, to control the sign of the chirp, i.e. whether positive or negative chirp is obtained. Thus, the additional control electrodes are used in combination with the asymmetric modulation electrodes, which provide for selectively generating negative or positive chirp, and optimization of amount of chirp respectively.

A control voltage applied to pads 156 and 154 effectively offsets the phase differential established by the optical path length differential of the two branch arms, and the control voltage is tuned to create the effective phase differential as previously discussed in the above mentioned applications.

Thus the structure of the modulator is similar to that described in the prior applications, except that the first and second modulation electrodes are of different dimensions, that is the modulation electrode on one arm is longer than the modulation electrode on the other arm of the modulator. Thus, the longer arm is biased more deeply to produce a larger phase change relative to the shorter arm, which provides added flexibility for controlling the phase shift variation to optmize frequency chirp.

Although specific embodiments of the invention have been described in detail, it will be apparent to one skilled in the art that variations and modifications to the embodiments may be made within the scope of the following claims.

What is claimed is:

1. A Mach-Zehnder phase modulator for selectively generating controlled chirp in an optical signal of a known free-space wavelength comprising:

an input y-junction waveguide coupler having an input waveguide for receiving the optical signal and first and second input branch waveguides an output y-junction waveguide coupler having an output waveguide for delivering the modulated optical signal and first and second output branch waveguides, a first interferometric arm between first branch waveguides of the input and output y-junction couplers defining a first optical path, a second interferometric arm between second branch waveguides of the input and output y-junction couplers defining a second optical path, and first and second modulation electrodes provided on the respective first and second interferometric arms for applying an electric field to each arm to modulate the effective phase difference between the arms, the first and second modulation electrodes differing in length, the length ratio of the first and second modulation electrodes being selected to optmize the amount of frequency chirp.

2. A Mach-Zehnder modulator according to claim 1 wherein one of the first and second path lengths of the respective interferometric arms is greater than the other by a distance which generates a fixed phase difference at the known free space wavelength.

3. A Mach-Zehnder modulator according to claim 2 wherein the fixed phase difference is $\pi$.

4. A Mach-Zehnder modulator according to claim 2 wherein the fixed phase difference is $\pi/2$.

5. A Mach-Zehnder modulator according to claim 2 wherein the fixed phase difference is zero, and the input y junction and output y junction are asymmetric to provide non-equal power splitting between the two interferometric arms.

6. A Mach-Zehnder optical modulator according to claim 1 comprising a negative chirp MZ modulator.

7. A Mach-Zehnder optical modulator according to claim 1 comprising a positive chirp MZ modulator.

8. A Mach-Zehnder optical modulator according to claim 1 comprising a configurable chirp MZ modulator.

9. A Mach-Zehnder modulator according to claim 1 wherein the modulation electric field is applied to each arm is in equal push-pull mode.

10. A Mach-Zehnder modulator according to claim 1 wherein the modulation electric field is applied to each arm is in non-equal push-pull mode.

11. A Mach-Zehnder modulator according to claim 1 modulator fabricated from an III–V MQW semiconductor structure.

12. A Mach-Zehnder modulator according to claim 1 modulator fabricated $LiNbO_3$ modulator.

* * * * *